US009181418B2

(12) United States Patent
Jheng et al.

(10) Patent No.: US 9,181,418 B2
(45) Date of Patent: Nov. 10, 2015

(54) PVC PRODUCT AND METHOD FOR TREATING SURFACE THEREOF

(71) Applicant: Industrial Technology Research Institute, Hsinchu (TW)

(72) Inventors: Li-Cheng Jheng, Kaohsiung (TW); Cheng-Wei Yeh, Pingtung (TW); Kuo-Chen Shih, Kaohsiung (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 197 days.

(21) Appl. No.: 13/728,260

(22) Filed: Dec. 27, 2012

(65) Prior Publication Data

US 2014/0148539 A1    May 29, 2014

(30) Foreign Application Priority Data

Nov. 27, 2012  (TW) .............. 101144264 A

(51) Int. Cl.
C08K 5/39      (2006.01)
C08J 3/24      (2006.01)
C08K 5/12      (2006.01)
C08K 5/40      (2006.01)
C08K 5/19      (2006.01)
C08J 7/12      (2006.01)

(52) U.S. Cl.
CPC ... C08K 5/39 (2013.01); C08J 3/24 (2013.01); C08J 3/243 (2013.01); C08J 3/245 (2013.01); C08J 7/12 (2013.01); C08K 5/12 (2013.01); C08K 5/19 (2013.01); C08K 5/40 (2013.01); C08J 2327/22 (2013.01); C08J 2327/24 (2013.01)

(58) Field of Classification Search
CPC .............. C08J 3/24; C08J 3/243; C08J 3/245; C08J 7/12; C08J 2327/22; C08J 2327/24; C08J 2327/06; C08K 5/39; C08K 5/40; C08K 5/19
USPC ............................ 525/331.5, 331.6, 345, 352
See application file for complete search history.

(56) References Cited

U.S. PATENT DOCUMENTS

| | | | |
|---|---|---|---|
| 4,045,600 A | 8/1977 | Williams | |
| 4,069,517 A | 1/1978 | Graham | |
| 4,147,853 A | 4/1979 | Goswami et al. | |
| 4,272,559 A | 6/1981 | Asai et al. | |
| 4,605,592 A | 8/1986 | Paquette et al. | |
| 4,806,393 A | 2/1989 | Levin | |
| 5,209,931 A * | 5/1993 | Levin ............................ 424/405 |
| 5,306,744 A | 4/1994 | Wolfersberger et al. | |
| 5,404,560 A | 4/1995 | Lee et al. | |
| 5,428,087 A | 6/1995 | Petit et al. | |
| 5,597,466 A | 1/1997 | Bauer et al. | |
| 5,623,014 A | 4/1997 | Bauer et al. | |
| 6,160,028 A | 12/2000 | Dyer | |
| 6,184,375 B1 | 2/2001 | Huglin et al. | |
| 6,369,267 B1 | 4/2002 | Toan et al. | |
| 7,618,559 B2 | 11/2009 | Yoshida et al. | |
| 8,013,050 B2 | 9/2011 | Mestach et al. | |
| 2002/0115859 A1 | 8/2002 | Lazzari et al. | |
| 2003/0060544 A1 | 3/2003 | Sutoris et al. | |
| 2005/0043552 A1 | 2/2005 | Hafner et al. | |
| 2005/0059769 A1 | 3/2005 | Chou et al. | |
| 2005/0228086 A1 | 10/2005 | Mehrer | |
| 2007/0129492 A1 | 6/2007 | Colborn et al. | |
| 2009/0226844 A1 | 9/2009 | Nozaki et al. | |
| 2009/0294735 A1 | 12/2009 | Yoshida et al. | |
| 2010/0190901 A1 | 7/2010 | Hill et al. | |
| 2010/0294997 A1 | 11/2010 | Yoshida et al. | |

FOREIGN PATENT DOCUMENTS

| | | |
|---|---|---|
| TW | 270126 | 2/1996 |
| TW | 440564 B | 6/2001 |
| TW | 546291 B | 8/2003 |
| TW | 557313 B | 10/2003 |
| TW | 572896 B | 1/2004 |
| TW | 584638 B | 4/2004 |
| TW | 200413459 | 8/2004 |
| TW | 200708546 | 3/2007 |
| TW | I295677 B | 4/2008 |
| TW | 200831565 A | 8/2008 |
| TW | I303449 B | 11/2008 |
| TW | I306892 B | 3/2009 |

OTHER PUBLICATIONS

Reddy et al., Journal of Applied Polymer Science 115 (2010) 1589-1597.*
García-Con et al., "A sulfur—su;fur cross-linked polymer synthesized from a polymerizable dithiocarbamate as a source of dormant radicals," Angewandte Chemie International Edition, vol. 49, Issue 24, Jun. 1, 2010, pp. 1-9 (pp. 4075-4078).
Guan et al., "Self-Crosslinking and Cocrosslinking with Nitrile Rubber of Poly(vinyl chloride) with Pendent N,N-Diethyldithiocarbamate Group," Journal of Applied Polymer Science, vol. 80, 2001, pp. 634-638.
Kameda et al., "Effect of phase-transfer catalyst on the chemical modification of poly(vinyl chloride) by substitution with thiocyanate as a nucleophile," Materials Chemistry and Physics, vol. 118, 2009, pp. 362-366.

(Continued)

Primary Examiner — Roberto Rabago
(74) Attorney, Agent, or Firm — Birch, Stewart, Kolasch & Birch, LLP

(57) ABSTRACT

Disclosed is a method for treating a surface of a PVC product. A PVC product including PVC and plasticizer is provided. A surface of the PVC product is treated by an aqueous solution of a crosslinking agent and a first phase transfer catalyst to form a first surface treated PVC product. The surface of the first surface treated PVC product is treated by an aqueous solution of an aqueous free radical initiator and a second phase transfer catalyst to form a second surface treated PVC product. As such, the release of the plasticizer from the PVC product to an environment is inhibited.

9 Claims, No Drawings

(56) References Cited

OTHER PUBLICATIONS

Lakshmi et al., "Photocross-linking of dithiocarbamate-substitute PVC reduces plasticizer migration," Polymer, vol. 39, No. 1, 1998, pp. 151-157.

Reddy et al., "Surface Treatment of Plasticized Poly(vinyl chloride) to Prevent Plasticizer Migration," Journal of Applied Polymer Science, vol. 115, 2010 (Published online: Oct. 7, 2009), pp. 1589-1597.
Taiwanese Office Action dated Apr. 21, 2014 for Taiwanese Application No. 101144264.

* cited by examiner

PVC PRODUCT AND METHOD FOR TREATING SURFACE THEREOF

CROSS REFERENCE TO RELATED APPLICATIONS

The present application is based on, and claims priority from, Taiwan Application Serial Number 101144264, filed on Nov. 27, 2012, the disclosure of which is hereby incorporated by reference herein in its entirety

TECHNICAL FIELD

The technical field relates to a PVC product containing a plasticizer.

BACKGROUND

The global usage of polyvinyl chloride (PVC) is second to polyethylene (PE). In 2009, the global production of PVC reached 41,610,000 tons, and the global demand for PVC reached 33,430,000 tons. PVC is not expensive due to its raw material being mass produced by mature process of cracking petroleum. In addition, extensively desired properties of PVC can be easily achieved by incorporation of a variety of additives such as plasticizers. Accordingly, PVC is one of the most used plastic for a wide variety of applications, which is difficultly to be replaced. PVCs classified as soft PVC, semi-hard PVC, and hard PVC depend on the amount of plasticizer within PVC. A soft PVC has a plasticizer amount of 40 phr to 150 phr, a semi-hard PVC has a plasticizer amount of about 15 phr, and a hard PVC has a plasticizer amount of less than 3 phr. PVC products used in many applications for instance include electric wires, electric cables, building materials, car accessories, medical drip bags, package containers, hoses, artificial leathers, and other household products.

Plasticizer is easily released from PVC products into the environment while under high temperature/high humidity conditions, contact with oil, contact with low-polarity organic solvents, or the likes. The issue of the released plasticizers harmful to health should be highly concerned when the PVC product is used in children's toys, food packaging containers, or twist caps of cans. Due to the safety and environmental issues, PVCs are being replaced with a new plastic material, and/or the conventional plasticizers are being replaced with environmentally friendly plastic plasticizers such as non-phthalate type plasticizer, epoxy soy bean oil plasticizers, or triformate plasticizers. Compared to conventional phthalate plasticizers, however, the environmentally friendly plastic plasticizers are not only relatively expensive, but also provide relatively insignificant plasticization effect on PVC. For safety and environmental issues, a novel method of inhibiting the plasticizer released from PVC products is called-for. In recent years, the methods of inhibiting the plasticizer release have been classified into four types: surface coating, crosslinking treatment, barrier layer, and plasticizer modification. However, the surface coating, the crosslinking treatment, and the barrier layer methods may locally vary the properties of PVC products according to a ratio of treatment area to the PVC product size.

SUMMARY

One embodiment of the disclosure provides a method for treating a surface of a PVC product, comprising: providing a PVC product including PVC and a plasticizer, treating a surface of the PVC product by a first aqueous solution of a crosslinking agent and a first phase transfer catalyst to form a first surface treated PVC product; and treating a surface of the first surface treated PVC product by a second aqueous solution of an aqueous free radical initiator and a second phase transfer catalyst to form a second surface treated PVC product.

One embodiment of the disclosure provides a PVC product, comprising: PVC and plasticizer; wherein the PVC product has a surface treated by a crosslinking agent and an aqueous free radical initiator.

A detailed description is given in the following embodiments.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details.

One embodiment of the disclosure provides a method of treating a surface of a PVC product, thereby inhibiting a plasticizer thereof released to an environment. First, a PVC product including PVC and a plasticizer is provided. In one embodiment, the PVC and the plasticizer have a weight ratio of 100:3 to 100:150. The plasticizer amount depends on the PVC product application, e.g. soft PVC, semi-hard PVC, or hard PVC. Other additives such as pigments, light stabilizer, antioxidant, filler, and the likes can be further added into the PVC product if necessary. The plasticizer can be di-2-ethylhexyl phthalate (DEHP), o-dibutylphthalate (DBP), butyl benzyl phthalate (BBP), diisononyl phthalate (DINP), diisodecyl phthalate (DIDP), dioctyl phthalate (DOP), or other general plasticizers.

Subsequently, a surface of the PVC product is treated by an aqueous solution of a crosslinking agent and a phase transfer catalyst to form a first surface treated PVC product. The crosslinking agent can be dithiocarbamate, such as potassium dihydroxyethyl dithiocarbamate, sodium diethyl dithiocarbamate, or the likes. The phase transfer catalyst can be tetraalkylammonium halide such as tetrabutylammonium chloride, tetrabutylammonium bromide, or the likes. In one embodiment, the concentration of the crosslinking agent in the aqueous solution ranges from 0.03M to 3M. An overly high concentration of the crosslinking agent will not further help the surface crosslinking taking place. An overly low concentration of the crosslinking agent will not reach the desired crosslinking effect. In one embodiment, the concentration of the phase transfer catalyst in the aqueous solution ranges from 0.1 wt % to 10 wt %. An overly high concentration of the phase transfer catalyst will not further help the crosslink effect. An overly low concentration of the phase transfer catalyst will not reach the desired crosslink effect. In one embodiment, the surface treatment is performed at a temperature of 60° C. to 100° C. The crosslinking of the PVC product surface will not take place at an overly low surface treatment temperature. The PVC product will deform and soften at an overly high surface treatment temperature.

Subsequently, a surface of the first surface treated PVC product is treated by an aqueous solution of an aqueous free radical initiator and a phase transfer catalyst to form a second surface treated PVC product. The aqueous free radical initiator can be persulfate, azo compound, or combinations thereof. The persulfate can be ammonium persulfate or sodium peroxodisulfate. The azo compound can be 2,2'-azobis[2-(2-imidazolin-2-yl)propane]dihydrochloride, 2,2'-azobis [2-(2-imidazolin-2-yl)-propane]disulfate dehydrate, 2,2'-Azobis (2-methylpropionamidine)dihydrochloride, 2,2'-azobis[N-(2-carboxyethyl)-2-methylpropionamidine]hydrate, 2,2'-azobis {2-[1-(2-hydroxyethyl)-2-imidazolin-2-yl] propane}dihydrochloride, 2,2'-azobis [2-(2-imidazolin-2-yl) propane], 2,2'-azobis(1-imino-1-pyrrolidino-2-ethylpropane)dihydrochloride, 2,2'-azobis{2-methyl-N[1,1-bis(hydroxymethyl)-2-hydroxyethl]propionamide}, or 2,2'-azobis [2-methyl-N-(2-hydroxyethyl)propionamide]. The phase transfer catalyst can be tetraalkylammonium halide such as tetrabutylammonium chloride, tetrabutylammonium bromide, or the likes. In one embodiment, the concentration of the aqueous free radical initiator in the aqueous solution ranges from 0.1 wt % to 20 wt %. An overly high concentration of the aqueous free radical initiator will not further inhibit the plasticizer released from the PVC product. An overly low concentration of the aqueous free radical initiator will not inhibit the plasticizer released from the PVC product. In one embodiment, the concentration of the phase transfer catalyst in the aqueous solution ranges from 0.1 wt % to 10 wt %. An overly high concentration of the phase transfer catalyst will not further inhibit the plasticizer released from the PVC product. An overly low concentration of the phase transfer catalyst will not inhibit the plasticizer released from the PVC product. In one embodiment, the surface treatment is performed at a temperature of 60° C. to 100° C. . The crosslinking of the PVC product surface will not take place at an overly low surface treatment temperature. The PVC product will deform and soften at an overly high surface treatment temperature.

After the two-step surface treatments, the plasticizer of the PVC product releasing into the environment can be dramatically inhibited. In addition, the both surface treatments are performed in aqueous solutions instead of in organic solvent solutions, which would prevent negative environmental impact caused from the organic solvents.

Below, exemplary embodiments will be described in detail with reference to accompanying drawings so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

EXAMPLES

Preparation Example 5 g of PVC (Mn=42,000) and 5 g of o-dibutylphthalate (DBP) served as plasticizer were put into a vial. 20 mL of tetrahydrofuran (THF) was added into the vial to dissolve the PVC and the plasticizer completely. A PVC film containing the plasticizer was casted form the solution onto a Petri dish by evaporation of THF at room temperature. The casted PVC film was cut into a stripe-shaped film (2 cm×1 cm) for use in the following Examples and Comparative Examples.

Comparative Example 1

The stripe-shaped PVC film of the Preparation Example was placed in a 20 mL vial. Subsequently, 5 mL of n-heptane was added into the vial, and the vial was then sealed for 1 hour. Thereafter, the DBP content within the n-heptane was analyzed by a gas chromatography-flame ionization detector (GC-FID); for which results thereof were tabulated and are shown in Table 1.

Example 1

Sodium diethyl dithiocarbamate (4.891 g, 0.3M) and tetrabutylammonium bromide (TBAB, 4.8 g, 4.8 wt %) were dissolved in water (95.2 g) to form an aqueous solution. The stripe-shaped PVC film of the Preparation Example was placed in the aqueous solution, and the aqueous solution was then heated to 60° C. And then the PVC film was treated at 60° C. for 2 hours. Next, the PVC film was washed by de-ionized water and then dried to obtain a first surface treated PVC film.

The first surface treated PVC film was placed in a 20 mL vial. Subsequently, 5 mL of n-heptane was added into the vial, and the vial was then sealed for 1 hour. Thereafter, the DBP content within the n-heptane was analyzed by a gas chromatography-flame ionization detector (GC-FID); for which results thereof were tabulated and are shown in Table 1. Compared to the PVC film in Comparative Example 1, the plasticizer released from the first surface treated PVC film in Example 1, largely decreased, e.g. from 605 ppm to 418 ppm.

Example 2

Sodium diethyl dithiocarbamate (4.891 g, 0.3M) and tetrabutyl ammonium bromide (TBAB, 4.8 g, 4.8 wt %) were dissolved in water (95.2 g) to form an aqueous solution. The stripe-shaped PVC film of the Preparation Example was placed in the aqueous solution, and the aqueous solution was then heated to 60° C. And then the PVC film was treated at 60° C. for 2 hours. Next, the PVC film was washed by de-ionized water and then dried to obtain a first surface treated PVC film.

Ammonium persulfate (2 g, 2.0 wt %) and tetrabutyl ammonium bromide (TBAB, 2 g, 2.0 wt %) were dissolved in water (96 g) to form an aqueous solution. The first surface treated PVC film was placed in the aqueous solution, and the aqueous solution was then heated to 60° C. And then the PVC film was treated at 60° C. for 2 hours. Next, the PVC film was washed by de-ionized water and then dried to obtain a second surface treated PVC film.

The second surface treated PVC film was placed in a 20 mL vial. Subsequently, 5 mL of n-heptane was added into the vial, and the vial was then sealed for 1 hour. Thereafter, the DBP content within the n-heptane was analyzed by a gas chromatography-flame ionization detector (GC-FID); for which results thereof were tabulated and are shown in Table 1. Compared to the first surface treated PVC film in Example 1, the plasticizer released from the second surface treated PVC film in Example 2, further decreased, e.g. from 418 ppm to 197 ppm.

Example 3

Sodium diethyl dithiocarbamate (4.891 g, 0.3M) and tetrabutyl ammonium bromide (TBAB, 4.8 g, 4.8 wt %) were dissolved in water (95.2 g) to form an aqueous solution. The stripe-shaped PVC film of the Preparation Example was placed in the aqueous solution, and the aqueous solution was then heated to 60° C. And then the PVC film was treated at 60° C. for 5 hours. Next, the PVC film was washed by de-ionized water and then dried to obtain a first surface treated PVC film.

Ammonium persulfate (2 g, 2.0 wt %) and tetrabutyl ammonium bromide (TBAB, 2 g, 2.0 wt %) were dissolved in water (96 g) to form an aqueous solution. The first surface treated PVC film was placed in the aqueous solution, and the aqueous solution was then heated to 60° C. And then the PVC film was treated at 60° C. for 11 hours. Next, the PVC film was washed by de-ionized water and then dried to obtain a second surface treated PVC film.

The second surface treated PVC film was placed in a 20 mL vial. Subsequently, 5 mL of n-heptane was added into the vial, and the vial was then sealed for 1 hour. Thereafter, the DBP content within the n-heptane was analyzed by a gas chromatography-flame ionization detector (GC-FID); for which results thereof were tabulated and are shown in Table 1. Compared to the second surface treated PVC film in Example 2, the plasticizer released from the second surface treated PVC film in Example 3, further decreased due to longer periods of the first and second surface treatment, e.g. from 197 ppm to 85 ppm.

Example 4

Sodium diethyl dithiocarbamate (4.891 g, 0.3M) and tetrabutylammonium bromide (TBAB, 4.8 g, 4.8 wt %) were dissolved in water (95.2 g) to form an aqueous solution. The stripe-shaped PVC film of the Preparation Example was placed in the aqueous solution, and the aqueous solution was then heated to 80° C. And then the PVC film was treated at 80° C. for 2 hours. Next, the PVC film was washed by de-ionized water and then dried to obtain a first surface treated PVC film.

Ammonium persulfate (2 g, 2.0 wt %) and tetrabutylammonium bromide (TBAB, 2 g, 2.0 wt %) were dissolved in water (96 g) to form an aqueous solution. The first surface treated PVC film was placed in the aqueous solution, and the aqueous solution was then heated to 80° C. And then the PVC film was treated at 80° C. for 2 hours. Next, the PVC film was washed by de-ionized water and then dried to obtain a second surface treated PVC film.

The second surface treated PVC film was placed in a 20 mL vial. Subsequently, 5 mL of n-heptane was added into the vial, and the vial was then sealed for 1 hour. Thereafter, the DBP content within the n-heptane was analyzed by a gas chromatography-flame ionization detector (GC-FID); for which results thereof were tabulated and are shown in Table 1. Compared to the second surface treated PVC film in Example 2, the plasticizer released from the second surface treated PVC film in Example 4, further decreased, following the higher first and second surface treatment temperatures, e.g. from 197 ppm to 65 ppm.

Example 5

Sodium diethyl dithiocarbamate (4.891 g, 0.3M) and tetrabutyl ammonium bromide (TBAB, 4.8 g, 4.8 wt %) were dissolved in water (95.2 g) to form an aqueous solution. The stripe-shaped PVC film of the Preparation Example was placed in the aqueous solution, and the aqueous solution was then heated to 80° C. And then the PVC film was treated at 80° C. for 5 hours. Next, the PVC film was washed by de-ionized water and then dried to obtain a first surface treated PVC film.

Ammonium persulfate (2 g, 2.0 wt %) and tetrabutylammonium bromide (TBAB, 2 g, 2.0 wt %) were dissolved in water (96 g) to form an aqueous solution. The first surface treated PVC film was placed in the aqueous solution, and the aqueous solution was then heated to 80° C. And then the PVC film was treated at 80° C. for 11 hours. Next, the PVC film was washed by de-ionized water and then dried to obtain a second surface treated PVC film.

The second surface treated PVC film was put into a 20 mL vial. Subsequently, 5 mL of n-heptane was added into the vial, and the vial was then sealed for 1 hour. Thereafter, the DBP content within the n-heptane was analyzed by a gas chromatography-flame ionization detector (GC-FID); for which results thereof were tabulated and are shown in Table 1. Compared to the second surface treated PVC film in Example 4, the plasticizer released from the second surface treated PVC film in Example 5, further decreased due to longer periods of the first and second surface treatment, e.g. from 65 ppm to 33 ppm.

Example 6

Potassium dihydroxyethyl dithiocarbamate (6.129 g, 0.3M) and tetrabutylammonium chloride (TBAC, 6 g, 6.0 wt %) were dissolved in water (94 g) to form an aqueous solution. The stripe-shaped PVC film of the Preparation Example was placed in the aqueous solution, and the aqueous solution was then heated to 80° C. And then the PVC film was treated at 80° C. for 5 hours. Next, the PVC film was washed by de-ionized water and then dried to obtain a first surface treated PVC film.

Ammonium persulfate (2 g, 2.0 wt %) and tetrabutylammonium bromide (TBAB, 2 g, 2.0 wt %) were dissolved in water (96 g) to form an aqueous solution. The first surface treated PVC film was placed in the aqueous solution, and the aqueous solution was then heated to 80° C. And then the PVC film was treated at 80° C. for 11 hours. Next, the PVC film was washed by de-ionized water and then dried to obtain a second surface treated PVC film.

The second surface treated PVC film was put into a 20 mL vial. Subsequently, 5 mL of n-heptane was added into the vial, and the vial was then sealed for 1 hour. Thereafter, the DBP content within the n-heptane was analyzed by a gas chromatography-flame ionization detector (GC-FID); for which results thereof were tabulated and are shown in Table 1. Compared to the second surface treated PVC film in Example 5, the plasticizer released from the second surface treated PVC film in Example 5, further decreased due to the crosslinking agent potassium dihydroxyethyl dithiocarbamate, e.g. from 33 ppm to <5 ppm.

TABLE 1

| | First surface treatment | | | Second surface treatment | | | Plasticizer |
| | | | | Sodium | | | |
| | Crosslinking agent | Temperature (° C.) | Period (hr) | persulfate (wt %) | Temperature (° C.) | Period (hr) | DBP (ppm) |
| --- | --- | --- | --- | --- | --- | --- | --- |
| Comparative Example 1 | None | | | | None | | 605 |
| Example 1 | Sodium diethyl | 60 | 2 | | None | | 418 |
| Example 2 | dithiocarbamate | 60 | 2 | 2 | 60 | 2 | 197 |
| Example 3 | | 60 | 5 | 2 | 60 | 11 | 85 |
| Example 4 | | 80 | 2 | 2 | 80 | 2 | 65 |
| Example 5 | | 80 | 5 | 2 | 80 | 11 | 33 |
| Example 6 | Potassium dihydroxyethyl dithiocarbamate | 80 | 5 | 2 | 80 | 11 | <5 |

Note:
gas chromatography-flame ionization detector (GC-FID) has a detection limit of 5 ppm.

It will be apparent to those skilled in the art that various modifications and variations can be made to the disclosed methods and materials. It is intended that the specification and examples be considered as exemplary only, with a true scope of the disclosure being indicated by the following claims and their equivalents.

What is claimed is:

1. A method for treating a surface of a PVC product, comprising:
   providing a PVC product including PVC and a plasticizer,
   treating a surface of the PVC product by a first aqueous solution of a crosslinking agent and a first phase transfer catalyst to form a first surface treated PVC product; and
   treating the surface of the first surface treated PVC product by a second aqueous solution of an aqueous free radical initiator and a second phase transfer catalyst to form a second surface treated PVC product.

2. The method as claimed in claim 1, wherein the concentration of the crosslinking agent in the aqueous solution ranges from 0.03M to 3M and the concentration of the first phase transfer catalyst in the aqueous solution ranges from 0.1 wt % to 10 wt %.

3. The method as claimed in claim 1, wherein the step of treating the surface of the PVC product by the first aqueous solution to form a first surface treated PVC product is performed at a temperature ranging from 60° C. to 100° C.

4. The method as claimed in claim 1, wherein the concentration of the aqueous free radical initiator in the aqueous solution ranges from 0.1 wt % to 20 wt %, and the concentration of the second phase transfer catalyst in the aqueous solution ranges from 0.1 wt % to 10 wt %.

5. The method as claimed in claim 1, wherein the step of treating the surface of the first surface treated PVC product by the second aqueous solution to form a second surface treated PVC product is performed at a temperature ranging from 60° C. to 100° C.

6. The method as claimed in claim 1, wherein the crosslinking agent comprises dithiocarbamate.

7. The method as claimed in claim 1, wherein the aqueous free radical initiator comprises persulfate, azo compound, or combinations thereof.

8. The method as claimed in claim 1, wherein the first and the second phase transfer catalyst comprises tetraalkylammonium halide.

9. The method as claimed in claim 1, wherein the release of the plasticizer to an environment is inhibited by the second surface treated PVC product.

* * * * *